US012657037B2

(12) United States Patent
Gerö et al.

(10) Patent No.: US 12,657,037 B2
(45) Date of Patent: Jun. 16, 2026

(54) METHOD FOR PROVISION OF ORCHESTRATION CONSTRAINTS FOR SOFTWARE APPLICATIONS AND SERVICES

(71) Applicant: Telefonaktiebolaget LM Ericsson (publ), Stockholm (SE)

(72) Inventors: Balázs Peter Gerö, Budapest (HU); András Kern, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 757 days.

(21) Appl. No.: 17/920,192

(22) PCT Filed: Apr. 30, 2020

(86) PCT No.: PCT/EP2020/062169
§ 371 (c)(1),
(2) Date: Oct. 20, 2022

(87) PCT Pub. No.: WO2021/219231
PCT Pub. Date: Nov. 4, 2021

(65) Prior Publication Data
US 2023/0161603 A1 May 25, 2023

(51) Int. Cl.
*G06F 9/445* (2018.01)
*G06F 8/65* (2018.01)
(Continued)

(52) U.S. Cl.
CPC ............ *G06F 9/44505* (2013.01); *G06F 8/65* (2013.01); *G06F 9/45558* (2013.01);
(Continued)

(58) Field of Classification Search
None
See application file for complete search history.

(56) References Cited

U.S. PATENT DOCUMENTS 7,958,496 B2 * 6/2011 Bjare ..................... G06F 9/5055
717/124
9,971,610 B2 * 5/2018 Angelsmark ........... H04W 4/90
(Continued)

FOREIGN PATENT DOCUMENTS

WO WO 2019/228632 A1 12/2019

OTHER PUBLICATIONS

International Search Report and Written Opinion of the International Searching Authority, PCT/EP2020/062169, mailed Jan. 25, 2021, 12 pages.
(Continued)

*Primary Examiner* — Van H Nguyen
(74) *Attorney, Agent, or Firm* — Sage Patent Group

(57) ABSTRACT

A method for orchestrating deployment of mixed function-based and container-based software in a network is disclosed. The method is executed by a first node in cooperation with a second and a third node in response to a request to run software utilizing at least one infrastructure component and at least one function component. The second node manages the infrastructure component, while the third node manages the function-as-a-service (FaaS) platform. The first node transmits a request to the second node to deploy the infrastructure component and identifies at least one FaaS platform to be employed. The first node further transmits a request to the third node to configure the identified FaaS platform for execution of the software. Accordingly, the first node operates as an orchestrator for both infrastructure-as-a-service (IaaS) and FaaS resources.

18 Claims, 7 Drawing Sheets

(51) Int. Cl.
| | | |
|---|---|---|
| *G06F 9/455* | (2018.01) | |
| *G06F 9/48* | (2006.01) | |
| *G06F 9/50* | (2006.01) | |

(52) U.S. Cl.
CPC .......... *G06F 9/4881* (2013.01); *G06F 9/5055* (2013.01); *G06F 9/5072* (2013.01); *G06F 9/5077* (2013.01); *G06F 2009/45562* (2013.01); *G06F 2209/501* (2013.01); *G06F 2209/506* (2013.01)

(56) References Cited

U.S. PATENT DOCUMENTS

| | | | | |
|---|---|---|---|---|
| 10,915,366 | B2 * | 2/2021 | Smith | H04L 9/3239 |
| 11,010,191 | B1 * | 5/2021 | Hornbeck | H04L 67/133 |
| 11,126,463 | B2 * | 9/2021 | Kim | G06F 9/5005 |
| 11,226,829 | B2 * | 1/2022 | Abbasipour | G06F 9/542 |
| 11,314,601 | B1 * | 4/2022 | Natanzon | G06F 11/3466 |
| 2019/0149480 | A1 | 5/2019 | Singhvi et al. | |
| 2019/0377604 | A1 * | 12/2019 | Cybulski | G06F 9/5072 |
| 2020/0081745 | A1 * | 3/2020 | Cybulski | G06F 9/545 |

OTHER PUBLICATIONS

"Scheduling, Preemption and Eviction," KubeCon & CloudNativeCon, NA 2022 Detroit, Michigan & Virtual, Oct. 24-28, 2022, 77 pages.

* cited by examiner

702

704

700

First Transmission Initiating Module

Second Transmission Initiating Module

METHOD FOR PROVISION OF ORCHESTRATION CONSTRAINTS FOR SOFTWARE APPLICATIONS AND SERVICES

CROSS REFERENCE TO RELATED APPLICATIONS

This application is a 35 U.S.C. § 371 national stage application of PCT International Application No. PCT/EP2020/062169 filed on Apr. 30, 2020, the disclosure and content of which is incorporated by reference herein in its entirety.

TECHNICAL FIELD

The disclosure relates to a method for handling the running of software and a node configured to operate in accordance with that method.

BACKGROUND

The European Telecommunications Standards Institute (ETSI) management and network orchestration (MANO) is a virtual network function (VNF) MANO software stack. It supports initiating several VNFs in affinity groups. Affinity groups provide a means to program the MANO stack to, for example, co-locate VNFs within an affinity group. Affinity groups have a scope attribute that defines the required proximity of worker nodes that an affinity group states as orchestration constraints. For example, the scope of an affinity group may be a worker node, i.e. the scope of an affinity group may be that all VNFs of the affinity group are initiated on the same worker node (which may be selected by the orchestration system).

OpenStack is a virtual infrastructure management software that supports affinity groups. In OpenStack, all virtual machines (VMs) in each affinity group are hosted in the same hypervisor. Kubernetes is a container infrastructure service management software that manages pods (which are constructs that represent the state of a containerised workload) over one or more servers. Kubernetes makes it possible to indicate that a pod is in an affinity or anti-affinity relation with other pods. Kubernetes introduced the concept of topology keys to express the scope of the affinity rules. Examples of the scope of the affinity rules include "same host", "same zone", "same region", "same host operation system". Kubernetes also allow other scopes to be defined.

Amazon Web Services (AWS) Lambda is a function-as-a-service (FaaS) platform, which allows a user to run function code without provisioning or managing servers. AWS Lambda allows a user to specify resource constraints on the hardware that runs the user functions. AWS Lambda@Edge allows a user to run (function) code across AWS locations globally, responding to end users at the lowest network latency. AWS Lambda@Edge functions are triggered in response to Amazon CloudFront requests.

AWS CloudFront is a fast content delivery network (CDN) service that supports triggering Lambda@Edge functions to run custom code closer to users. The Amazon CloudFront events provided are hypertext transfer protocol (HTTP) events that allow customising HTTP requests/responses (between the user and a HTTP based service) and allow customising the contents of the cache (origin request/response). AWS CloudFormation provides a common language to describe and provision all the infrastructure resources in an AWS cloud environment. It supports provisioning Lambda functions together with other AWS services, like elastic container service (ECS), which is a container orchestration and management system of AWS. Kubeless is an open source FaaS platform. It creates a Kubernetes deployment for each function and exposes the function as a Kubernetes cluster internet protocol (IP) service. Both deployment and service resource created for the function can be controlled by the function creator by explicitly specifying deployment spec and service spec respectively.

The configuration of a FaaS platform is out of scope for (and not supported by) VM, container and VNF orchestration systems. In the ETSI MANO framework, FaaS may be described as a set of VNFs that implement the FaaS platform. However, the specification of VNF configuration management interfaces is out of scope for ETSI MANO.

Functions may be (and typically are) deployed as containers via a container orchestration system, which may support affinity groups. As a result, containers that include functions may be co-located with other containers, e.g. in Kubeless. Resource constraints in AWS Lambda are limited to compute node specific bounds, like memory and central processing unit (CPU). Currently, the CPU requirement is derived from input memory constraints. AWS CloudFormation allows functions and containers to be deployed together as part of a virtual private cloud (VPC). However, deployments of Lambda functions are subject to the same limitations as stated for AWS Lambda. Function placement in AWS Lambda@Edge is limited to the closest AWS edge site to the users.

SUMMARY

It is an object of the disclosure to obviate or eliminate at least some of the above-described disadvantages associated with existing techniques.

Therefore, according to an aspect of the disclosure, there is provided a method performed by a first node for handling the running of software in a network. The method is performed in response to a first request to run software using at least one infrastructure component and at least one function component. The method comprises initiating transmission of a second request towards a second node. The second node is configured to manage the at least one infrastructure component. The second request is a request to deploy the at least one infrastructure component and comprises information indicative of at least one function-as-a-service (FaaS) platform implemented by the at least one infrastructure component to be used to run the software. The method comprises initiating transmission of a third request towards a third node. The third node is configured to manage the at least one FaaS platform. The third request is a request to configure the at least one FaaS platform to run the software.

There is thus provided an advantageous method for handling the running of software in a network. In particular, the method allows orchestration constraints for software (e.g. applications and/or services) to be provided, even where the software is comprised of functions and containers. Generally, orchestration constraints beyond node affinities are applicable in distributed cloud scenarios, for example, in edge cloud scenarios. Thus, the method allows the deployment of mixed function and container based software e.g. in an edge cloud.

In some embodiments, the second request may comprise one or more second constraints placed on the at least one infrastructure component, and/or the third request may be a request to configure the at least one FaaS platform to run the software according to one or more third constraints placed on the at least one FaaS platform.

In some embodiments, the one or more second constraints may comprise a constraint to locate the at least one infrastructure component at the same location as the at least one FaaS platform and/or a constraint to limit execution of the at least one function component to at least one infrastructure component that is running the at least one FaaS platform. In some embodiments, the one or more third constraints may comprise a constraint to limit execution of the at least one function component to a single one of the at least one FaaS platform or a constraint to limit execution of the at least one function component to a plurality of the at least one FaaS platform located at a same location.

In some embodiments, the first request may comprise one or more first constraints placed on the at least one infrastructure component and/or the at least one function component. This advantageously enables constraints to be expressed, for example, on at least one infrastructure component with respect to at least one function component and/or on at least one function component with respect to at least one infrastructure component.

In some embodiments, the one or more second constraints and/or the one or more third constraints may be based on the one or more first constraints. In this way, it is not necessary for the user (e.g. client) that generated the first request to construct the one or more second constraints or the one or more third constraints. This reduces the burden on the user and also avoids human error.

In some embodiments, the one or more second constraints may be the same as the one or more first constraints except that the one or more second constraints are placed on the at least one infrastructure component, whereas the one or more first constraints are placed on the at least one infrastructure component and/or the at least one function component. In some embodiments, the one or more third constraints are the same as the one or more first constraints except that the one or more third constraints are placed on the at least one FaaS platform, whereas the one or more first constraints are placed on the at least one infrastructure component and/or the at least one function component.

In some embodiments, the method may comprise, in response to the infrastructure component failing to deploy, repeating initiation of the transmission of the second request towards the second node until the at least one infrastructure component is deployed.

In some embodiments, if the at least one FaaS platform is already deployed, the information indicative of the at least one FaaS platform may be information indicative of the already deployed at least one FaaS platform. Thus, the method allows different software (e.g. multiple applications and/or services) to utilise the same at least one FaaS platform, which enables improved resource utilisation.

In some embodiments, if the already deployed at least one FaaS platform fails to meet one or more requirements of the software, the second request may further comprise information indicative of one or more changes to be made to the already deployed at least one FaaS platform for the already deployed at least one FaaS platform to meet the one or more requirements of the software. Thus, the method allows adapting the at least one FaaS platform to requirements of the software instead of deploying any new FaaS platforms to reach improved resource utilisation.

In some embodiments, if the at least one FaaS platform is not already deployed, the second request may be a request to deploy the at least one infrastructure component and the at least one FaaS platform. Thus, the method has the flexibility to, for example, allow the placement of one or more (second) location constraints on the at least one infrastructure component and the at least one FaaS platform and enable ensuring any (first) constraints in the first message.

In some embodiments, initiating the transmission of the third request towards the third node may be in response to successful deployment of the at least one FaaS platform. Thus, the method can ensure that the configuration(s) transmitted to the second and the third nodes is consistent.

In some embodiments, the method may comprise, in response to unsuccessful deployment of the at least one FaaS platform, initiating transmission of a message to indicate that the deployment of the at least one FaaS platform is unsuccessful. In some embodiments, the method may comprise, in response to successful deployment of the at least one FaaS platform, initiating transmission of a message to indicate that the deployment of the at least one FaaS platform is successful. Thus, the method can ensure that the configuration(s) transmitted to the second and the third nodes is consistent.

In some embodiments, the method may comprise, in response to unsuccessful configuration of the at least one FaaS platform to run the software, initiating transmission of a message to indicate that configuration of the at least one FaaS platform to run the software is unsuccessful. In some embodiments, the method may comprise, in response to successful configuration of the at least one FaaS platform to run the software, initiating transmission of a message to indicate that the configuration of the at least one FaaS platform to run the software is successful.

In some embodiments, the first request may be for running the software using a plurality of groups of components, wherein each group of the plurality of groups of components comprises at least one infrastructure component and/or at least one function component, and the method may be performed for each group of the plurality of groups of components. In this way, the method can enable location constraints to be expressed on function executions with respect to the location of the infrastructure components of the same software.

In some embodiments, the software may be a service or an application.

In some embodiments, the at least one function component may comprise at least one function, and/or the at least one infrastructure component may comprise at least one container and/or at least one virtual machine.

According to another aspect of the disclosure, there is provided a first node. The first node comprises processing circuitry configured to operate in accordance with the method described earlier. The first node thus provides the advantages discussed earlier in respect of the method. In some embodiments, the first node may comprise at least one memory for storing instructions which, when executed by the processing circuitry, cause the first node to operate in accordance with the method described earlier.

According to another aspect of the disclosure, there is provided a computer program comprising instructions which, when executed by processing circuitry, cause the processing circuitry to perform the method described earlier. The computer program thus provides the advantages discussed earlier in respect of the method.

According to another aspect of the disclosure, there is provided a computer program product, embodied on a non-transitory machine readable medium, comprising instructions which are executable by processing circuitry to cause the processing circuitry to perform the method described earlier. The computer program product thus provides the advantages discussed earlier in respect of the method.

Therefore, an advantageous technique for handling the running of software in a network is provided.

BRIEF DESCRIPTION OF THE DRAWINGS

For a better understanding of the technique, and to show how it may be put into effect, reference will now be made, by way of example, to the accompanying drawings, in which.

DETAILED DESCRIPTION

As mentioned earlier, an advantageous technique for handling the running of software in a network is described herein. Herein, software may be any type of software. For example, the software referred to herein can be a service, an application, or any other software. Generally, a service is software intended to be managed for users and an application is software intended to be installed and managed by users. In some embodiments, a service can be a communication service. The technique described herein for handling the running of software in a network is implemented by a first node.

Figure 1:
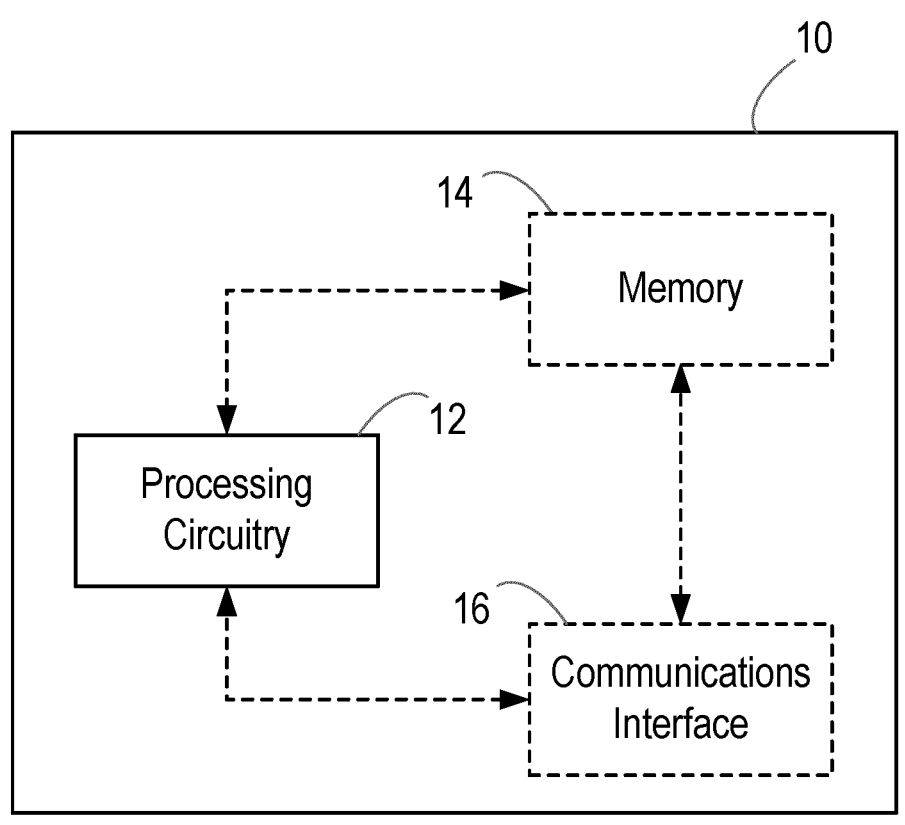
FIG. 1 is a block diagram illustrating a first node according to an embodiment.

FIG. 1 illustrates such a first node 10 in accordance with an embodiment. The first node 10 is for handling the running of software in a network. The first node 10 may, for example, be a physical machine (e.g. a server) or a virtual machine (VM).

As illustrated in FIG. 1, the first node 10 comprises processing circuitry (or logic) 12. The processing circuitry 12 controls the operation of the first node 10 and can implement the method described herein in respect of the first node 10. The processing circuitry 12 can be configured or programmed to control the first node 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first node 10. In some embodiments, the processing circuitry 12 can be configured to run software to perform the method described herein in respect of the first node 10. The software may be containerised according to some embodiments. Thus, in some embodiments, the processing circuitry 12 may be configured to run a container to perform the method described herein in respect of the first node 10.

Briefly, the processing circuitry 12 of the first node 10 is configured to, in response to a first request to run software using at least one infrastructure component and at least one function component, initiate transmission of a second request towards a second node and initiate transmission of a third request towards a third node. The second node is configured to manage the at least one infrastructure component. The second request is a request to deploy the at least one infrastructure component and comprises information indicative of at least one FaaS platform implemented by the at least one infrastructure component to be used to run the software. The third node is configured to manage the at least one FaaS platform and wherein the third request is a request to configure the at least one FaaS platform to run the software.

As illustrated in FIG. 1, in some embodiments, the first node 10 may optionally comprise a memory 14. The memory 14 of the first node 10 can comprise a volatile memory or a non-volatile memory. In some embodiments, the memory 14 of the first node 10 may comprise a nontransitory media. Examples of the memory 14 of the first node 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first node 10 can be connected to the memory 14 of the first node 10. In some embodiments, the memory 14 of the first node 10 may be for storing program code or instructions which, when executed by the processing circuitry 12 of the first node 10, cause the first node 10 to operate in the manner described herein in respect of the first node 10. For example, in some embodiments, the memory 14 of the first node 10 may be configured to store program code or instructions that can be executed by the processing circuitry 12 of the first node 10 to cause the first node 10 to operate in accordance with the method described herein in respect of the first node 10. Alternatively or in addition, the memory 14 of the first node 10 can be configured to store any information, data, messages, requests, responses, indications, notifications, signals, or similar, that are described herein. The processing circuitry 12 of the first node 10 may be configured to control the memory 14 of the first node 10 to store information, data, messages, requests, responses, indications, notifications, signals, or similar, that are described herein.

In some embodiments, as illustrated in FIG. 1, the first node 10 may optionally comprise a communications interface 16. The communications interface 16 of the first node 10 can be connected to the processing circuitry 12 of the first node 10 and/or the memory 14 of first node 10. The communications interface 16 of the first node 10 may be operable to allow the processing circuitry 12 of the first node 10 to communicate with the memory 14 of the first node 10 and/or vice versa. Similarly, the communications interface 16 of the first node 10 may be operable to allow the processing circuitry 12 of the first node 10 to communicate with any other node described herein. The communications interface 16 of the first node 10 can be configured to transmit and/or receive information, data, messages, requests, responses, indications, notifications, signals, or similar, that are described herein. In some embodiments, the processing circuitry 12 of the first node 10 may be configured to control the communications interface 16 of the first node 10 to transmit and/or receive information, data, messages, requests, responses, indications, notifications, signals, or similar, that are described herein.

Although the first node 10 is illustrated in FIG. 1 as comprising a single memory 14, it will be appreciated that the first node 10 may comprise at least one memory (i.e. a single memory or a plurality of memories) 14 that operate in the manner described herein. Similarly, although the first node 10 is illustrated in FIG. 1 as comprising a single communications interface 16, it will be appreciated that the first node 10 may comprise at least one communications interface (i.e. a single communications interface or a plurality of communications interface) 16 that operate in the manner described herein. It will also be appreciated that FIG. 1 only shows the components required to illustrate an embodiment of the first node 10 and, in practical implementations, the first node 10 may comprise additional or alternative components to those shown.

Figure 2:
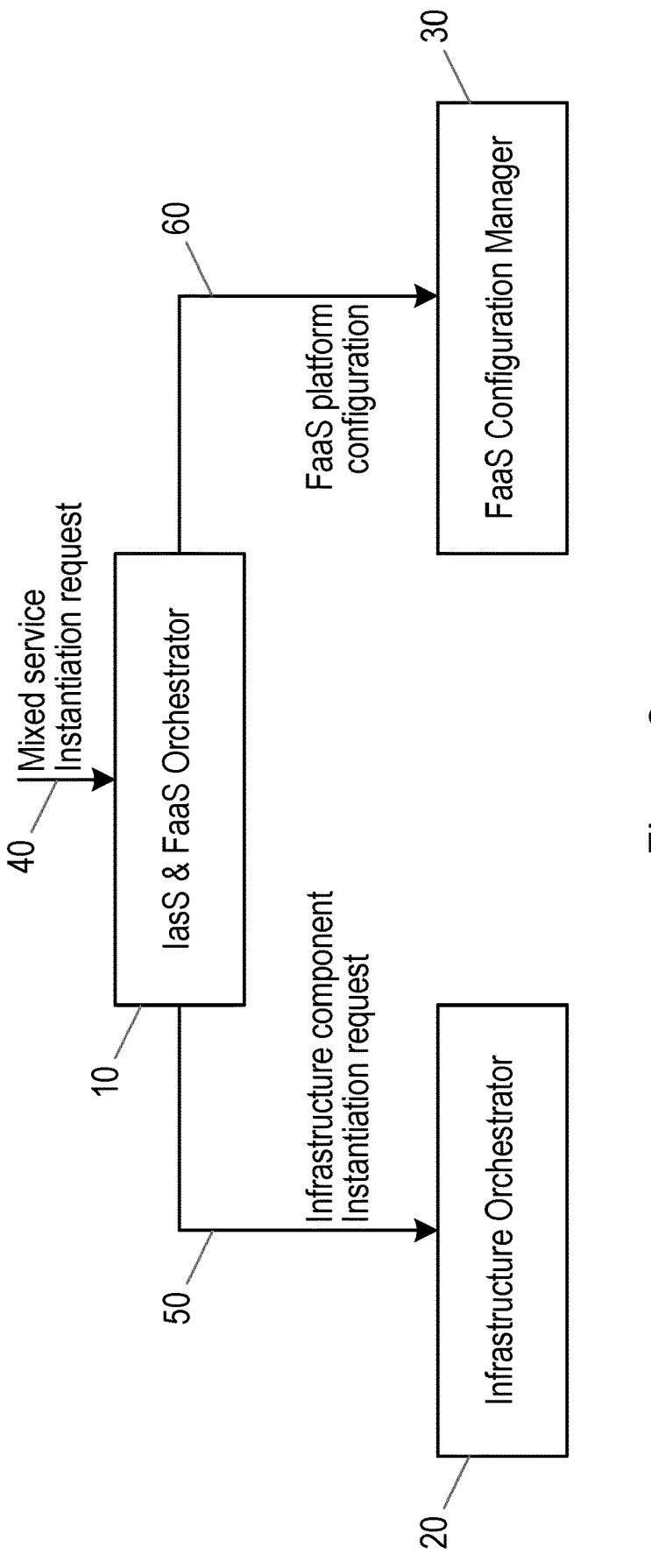
FIG. 2 is a block diagram illustrating a system according to an embodiment.

FIG. 2 is a block diagram illustrating a system in accordance with an embodiment. The system illustrated in FIG. 2 comprises the first node 10 described earlier. The system illustrated in FIG. 2 also comprises a second node 20 and a third node 30.

The second node 20 is configured to manage at least one infrastructure component. The second node 20 can be a (e.g. cloud) orchestration component according to some embodiments. Thus, the second node 20 can be referred to as an infrastructure orchestrator component. The second node 20 may be in charge of orchestrating infrastructure components (e.g. virtual machines, containers, or any other infrastructure components) of the software to be run. The second node 20 can offer a configuration application programming interface (API) to the first node 10, e.g. for programming constraints on running software.

The third node 30 is configured to manage (e.g. the configuration of) at least one FaaS platform. The third node 30 can be a (e.g. cloud) management component according to some embodiments. Thus, the third node 30 can be referred to as a FaaS (configuration) manager component. The third node 30 may supervise the configuration of one or more FaaS platforms. The third node 30 can offer a configuration API to the first node 10, e.g. for programming constraints on running software.

In some embodiments, the first node 10 may be an apparatus. In some of these embodiments, the second node 20 and/or the third node 30 may be part of the same apparatus as the first node 10. The first node 10 can be a (e.g. cloud) orchestration component according to some embodiments. The first node 10 can be configured to communicate (or interact) with the second node 20 to manage at least one infrastructure component and communicate (or interact) with the third node 30 to manage at least one FaaS platform. Thus, the first node 10 can be referred to as an infrastructure-as-a-service (IaaS) and FaaS orchestrator node.

Herein, any references to the at least one FaaS platform will be understood to mean the at least one FaaS platform itself or an instance of the at least one FaaS platform, i.e. at least one FaaS platform instance. Also, any reference to software will be understood to mean an application, a service, or any other type of software. In some embodiments, the software may be a (e.g. FaaS) service that is shared across applications. In these embodiments, the (e.g. FaaS) service may already be deployed by the time of service instantiation. In other embodiments, the software may be a (e.g. FaaS) service that is dedicated to an application. In these embodiments, the (e.g. FaaS) service may be deployed together with the application.

Figure 3:
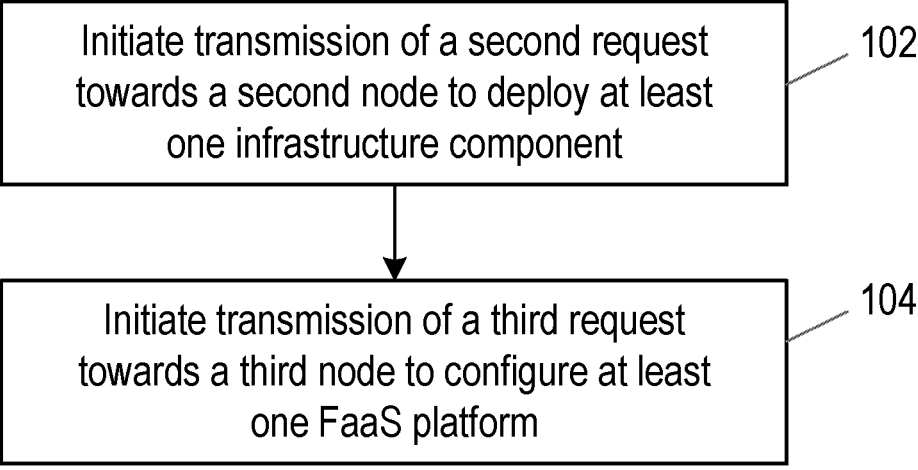
FIG. 3 is a flowchart illustrating a method performed by a first node according to an embodiment.

FIG. 3 is a flowchart illustrating a method performed by the first node 10 in accordance with an embodiment. The method is for handling the running of software in a network.

The first node 10 described earlier with reference to FIG. 1 is configured to operate in accordance with the method of FIG. 3. The method can be performed by or under the control of the processing circuitry 12 of the first node 10. The method will now be described with reference to FIGS. 2 and 3.

The method is performed in response to a first request 40 to run software using at least one infrastructure component and at least one function component. In some embodiments, the at least one function component may comprise at least one function and/or any other function component, or any combination of function components. In some embodiments, the at least one infrastructure component may comprise at least one container, at least one virtual machine (VM), and/or any other infrastructure component, or any combination of infrastructure components.

The first request 40 may be from a client. The first request 40 may be referred to as a mixed request. In some embodiments, the first request 40 to run software may be a request to instantiate the software. That is, the first request 40 may be a request to create an instance of the software. Thus, in some embodiments, the software referred to herein may be an instance of software, which can also be referred to as a software instance. In embodiments involving the instantiation of software, the first request 40 can be referred to as a mixed software (e.g. service or application) instantiation request.

As illustrated at block 102 of FIG. 3, in response to the first request 40 to run software using at least one infrastructure component and at least one function component, transmission of a second request 50 is initiated towards the second node 20. More specifically, the processing circuitry 12 of the first node 10 initiates the transmission of the second request 50. Herein, the term "initiate" can mean, for example, cause or establish. Thus, the processing circuitry 12 of the first node 10 can be configured to itself transmit the second request 50 (e.g. via a communications interface 16 of the first node 10) or can be configured to cause another node to transmit the second request 50. The second node 20 is configured to manage the at least one infrastructure component. The second request 50 is a request to deploy the at least one infrastructure component and comprises information indicative of at least one FaaS platform implemented by the at least one infrastructure component to be used to run the software.

As illustrated at block 104 of FIG. 3, also in response to the first request 40 to run software using at least one infrastructure component and at least one function component, transmission of a third request 60 is initiated towards the third node 30. More specifically, the processing circuitry 12 of the first node 10 initiates the transmission of (e.g. itself transmits, such as via a communications interface 16 of the first node 10, or causes another node to transmit) the third request 60. The third node 30 is configured to manage the at least one FaaS platform. The third request 60 is a request to configure the at least one FaaS platform to run the software.

In some embodiments, the first request 40 may comprise one or more first constraints placed on the at least one infrastructure component and/or the at least one function component. In some embodiments, the second request 50 may comprise one or more second constraints placed on the at least one infrastructure component. In some embodiments, the one or more second constraints may comprise a constraint to locate the at least one infrastructure component at the same location as the at least one FaaS platform and/or a constraint to limit execution of the at least one function component to at least one infrastructure component that is running the at least one FaaS platform. In some embodiments, the one or more second constraints may be based on the one or more first constraints.

In some embodiments, the third request 60 may be a request to configure the at least one FaaS platform to run the software according to one or more third constraints placed on the at least one FaaS platform. In some embodiments, the one or more third constraints may comprise a constraint to limit execution of the at least one function component to a single one of the at least one FaaS platform or a constraint to limit execution of the at least one function component to a plurality of the at least one FaaS platform located at a same location. In some embodiments, the one or more third constraints may be based on the one or more first constraints.

In some embodiments, the one or more second constraints may be the same as the one or more first constraints except that the one or more second constraints are placed on the at least one infrastructure component, whereas the one or more first constraints are placed on the at least one infrastructure component and/or the at least one function component. Alternatively or in addition, in some embodiments, the one or more third constraints may be the same as the one or more first constraints except that the one or more third constraints are placed on the at least one FaaS platform, whereas the one or more first constraints are placed on the at least one infrastructure component and/or the at least one function component. The constraints referred to herein may also be referred to as attributes or scope attributes.

Although not illustrated in FIG. 3, in some embodiments, in response to the infrastructure component failing to deploy, initiation of the transmission of the second request 50 towards the second node 20 may be repeated until the at least one infrastructure component is deployed. More specifically, in some embodiments, the processing circuitry 12 of the first node 10 may be configured to repeat the initiation of the transmission of the second request 50 towards the second node 20 until the at least one infrastructure component is deployed.

In some embodiments, if the at least one FaaS platform is already deployed, the information indicative of the at least one FaaS platform may be information indicative of the already deployed at least one FaaS platform. In some of these embodiments, if the already deployed at least one FaaS platform fails to meet one or more requirements of the software, the second request 50 may further comprise information indicative of one or more changes to be made to the already deployed at least one FaaS platform for the already deployed at least one FaaS platform to meet the one or more requirements of the software. On the other hand, in some embodiments, if the at least one FaaS platform is not already deployed, the second request 50 may be a request to deploy the at least one infrastructure component and the at least one FaaS platform.

In some embodiments, the transmission of the third request 60 mentioned earlier may be initiated towards the third node 30 in response to successful deployment of the at least one FaaS platform. In some embodiments, in response to successful deployment of the at least one FaaS platform, transmission of a message may be initiated to indicate that the deployment of the at least one FaaS platform is successful. In some embodiments, in response to unsuccessful deployment of the at least one FaaS platform, transmission of a message may be initiated to indicate that the deployment of the at least one FaaS platform is unsuccessful. More specifically, the processing circuitry 12 of the first node 10 may be configured to initiate the transmission of (e.g. itself transmit, such as via a communications interface 16 of the first node 10, or cause another node to transmit) the message indicative of whether the deployment of the at least one FaaS platform is successful or unsuccessful.

In some embodiments, in response to successful configuration of the at least one FaaS platform to run the software, transmission of a message may be initiated to indicate that the configuration of the at least one FaaS platform to run the software is successful. In some embodiments, in response to unsuccessful configuration of the at least one FaaS platform to run the software, transmission of a message may be initiated to indicate that configuration of the at least one FaaS platform to run the software is unsuccessful. More specifically, the processing circuitry 12 of the first node 10 may be configured to initiate the transmission of (e.g. itself transmit, such as via a communications interface 16 of the first node 10, or cause another node to transmit) the message indicative of whether the configuration of the at least one FaaS platform to run the software is successful or unsuccessful.

In some embodiments, the first request 40 in response to which the method is performed may be for running the software using a plurality of groups of components. In these embodiments, each group of the plurality of groups of components can comprise at least one infrastructure component and/or at least one function component. In some of these embodiments, the method described herein may be performed for each group of the plurality of groups of components. A group of components may also be referred to as an affinity group. An affinity group comprises components that have an affinity to each other. For example, an affinity group can comprise components that have one or more of the same constraints placed on them. Examples of these constraints include, but are not limited to, host, location, zone, region, site, etc.

There are various types of affinity group in respect of which the method described herein may be performed. The one or more first constraints placed on the at least one infrastructure component and/or the at least one function component may be different depending on the affinity group to which the at least one infrastructure component and/or the at least one function component belongs. An example of an affinity group is a node affinity group. In this respect, the one or more first constraints placed on at least one infrastructure component and/or the at least one function component of a node affinity group may comprise a constraint that the at least one infrastructure component and/or the at least one function component of the node affinity group are to be co-located at a particular node (e.g. a Kubernetes worker node). Another example of an affinity group is a site affinity group. In this respect, the one or more first constraints placed on at least one infrastructure component and/or the at least one function component of a node affinity group may comprise a constraint that the at least one infrastructure component and/or the execution of the at least one function component of the node affinity group are to be co-located at a particular site (e.g. on any worker nodes of a Kubernetes cluster that spans a site). Although some examples of types of affinity group have been provided, it will be understood that the method described herein may be performed in respect of any other type of affinity group.

The first node 10 described herein is able to manage the affinity constraints of a first request 40, even when the first request 40 is to run software using at least one infrastructure component and at least one function component. The affinity groups can be extended to contain both infrastructure components and function components. The first node 10 can ensure that functions are executed consistently with the given affinity constraints. More specifically, the first node 10 can enable the running of software using at least one infrastructure component and at least one function component in line with the affinity constraints that are set between these components, regardless of whether these components are infrastructure or function components.

Figure 4:
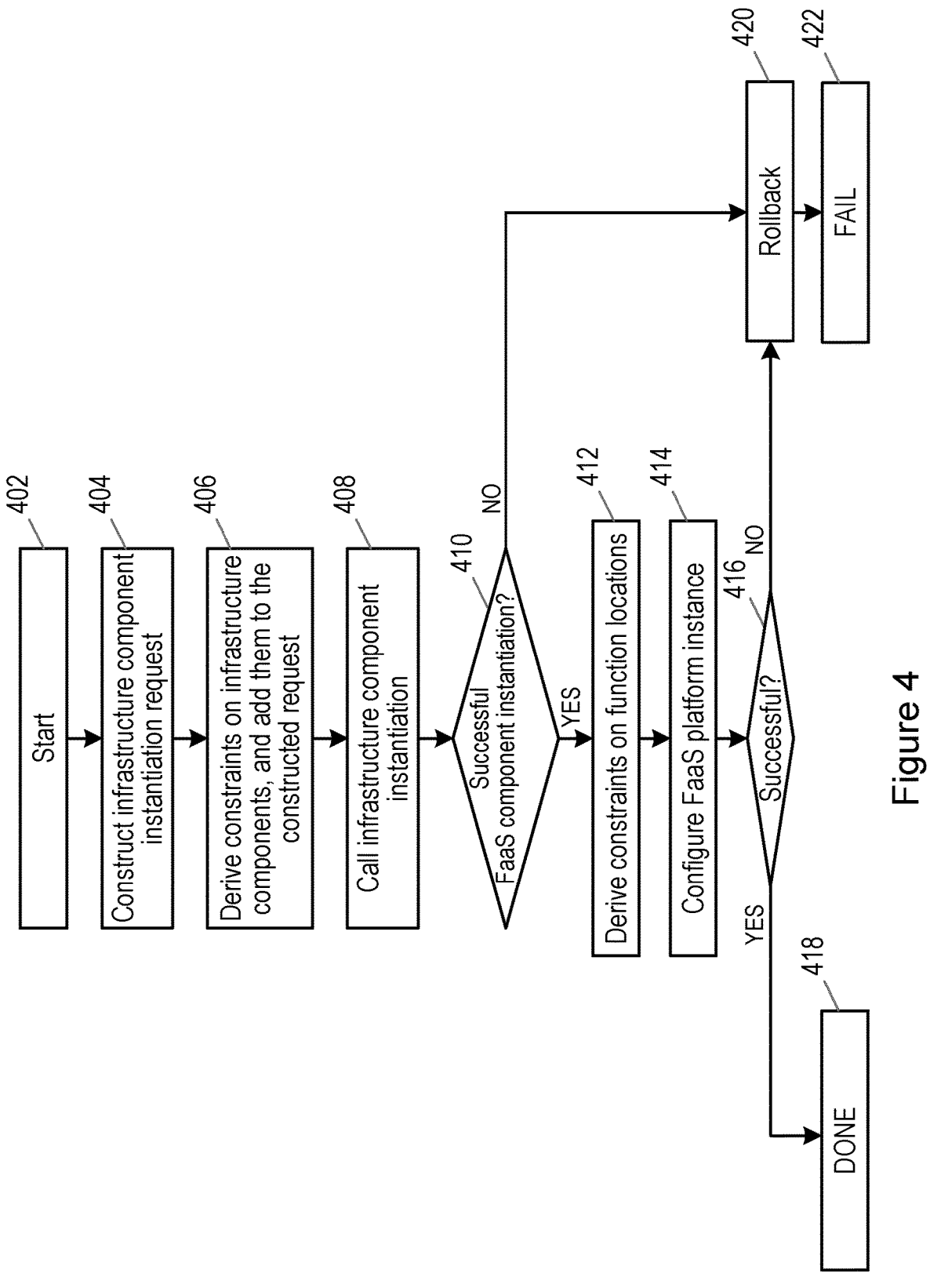
FIG. 4 is a flowchart illustrating a method performed by a first node according to an embodiment.

FIG. 4 is a flowchart illustrating a method performed by a first node 10 in accordance with an embodiment. The method is for handling the running of software in a network. More specifically, the method illustrates a software instantiation procedure. The first node 10 described earlier with reference to FIG. 1 is configured to operate in accordance with the method of FIG. 4. The method can be performed by or under the control of the processing circuitry 12 of the first node 10. The method will now be described with reference to FIGS. 2 and 4.

The method is started at block 402 of FIG. 4. In response to the first request 40 to run (or instantiate) software using at least one infrastructure component and at least one function component, the first node 10 interacts with the second node 20 and third node 30 described earlier in order to deploy the necessary infrastructure component(s) and configure (e.g. program) the necessary FaaS platform(s). The first node 10 may also prepare the necessary configuration constraints (or instructions) required during the interactions with the second node 20 and third node 30.

In more detail, at block 404 of FIG. 4, the first node 10 (or, more specifically, the processing circuitry 12 of the first node 10) constructs the second request 50. As mentioned earlier, the second request 50 is a request to deploy the at least one infrastructure component and comprises information indicative of at least one FaaS platform implemented by the at least one infrastructure component to be used to run the software. Thus, the second request 50 may comprise a first request element for the infrastructure component(s) of the software and a second request element for the FaaS platform to be used by the software. As will be described in more detail later, in some embodiments, the second request 50 may also comprise one or more second constraints placed on the at least one infrastructure component. The one or more second constraints may be the same as the one or more first constraints provided by the first request 40.

In some embodiments, when the at least one FaaS platform is already deployed (e.g. shared among multiple applications), the second request 50 may be programmed to use this deployment. For example, the information in the second request 50 that is indicative of at least one FaaS platform may be a reference to this existing deployment. In other embodiments, when the at least one FaaS platform is not already deployed or is not dedicated to the software to be run, the second request 50 may encode the necessary changes in the deployment. For example, the information in the second request 50 that is indicative of at least one FaaS platform may be a request to instantiate the at least one FaaS platform.

At block 406 of FIG. 4, the first node 10 (or, more specifically, the processing circuitry 12 of the first node 10) may derive the one or more second constraints to be placed on the at least one infrastructure component instantiation. The one or more second constraints can take into account the one or more first constraints provided by the first request 40. The first node 10 (or, more specifically, the processing circuitry 12 of the first node 10) may add the one or more second constraints to the second request 50. An example of the derivation of the one or more second constraints will be described later with reference to FIG. 5. In some cases, the first node 10 (or, more specifically, the processing circuitry

12 of the first node 10) may conclude that one or more second constraints are not actually needed. In these cases, the at least one infrastructure component can be instantiated.

At block 408 of FIG. 4, the first node 10 (or, more specifically, the processing circuitry 12 of the first node 10) initiates transmission of the second request 50 towards the second node 20. As mentioned earlier, the second node 20 is configured to manage the at least one infrastructure component. In this way, infrastructure component instantiation can be called. In some embodiments, the second request 50 may comprises a request to deploy the at least one infrastructure component and/or the at least one FaaS platform. Depending on the implementation of the second node 20, the first node 10 may initiate transmission of more than one second request 50 towards the second node 20. For example, the first node 10 may apply a trial and error scheme to ensure the deployment of the at least one infrastructure component.

In some embodiments, when the at least one FaaS platform is requested as a shared platform, the first node 10 (or, more specifically, the processing circuitry 12 of the first node 10) may enable the second node 20 to use at least one already existing FaaS platform. In some of these embodiments, the first node 10 (or, more specifically, the processing circuitry 12 of the first node 10) may update the at least one already existing FaaS platform to fulfill one or more first constraints provided with the first request 40. In embodiments where the at least one FaaS platform is to be dedicated to the software, the first node 10 (or, more specifically, the processing circuitry 12 of the first node 10) may request that at least one new FaaS platform is created.

At block 410 of FIG. 4, the first node 10 (or, more specifically, the processing circuitry 12 of the first node 10) may wait until the second node 20 has finished the instantiation of the at least one FaaS platform and check if the deployment is successful. If the deployment of the at least one FaaS platform is successful, the method proceeds to block 412. If the deployment of the at least one FaaS platform is unsuccessful, the method proceeds to block 420. At block 420 of FIG. 4, the first node 10 (or, more specifically, the processing circuitry 12 of the first node 10) may roll back or reverse any change conducted during the procedure. At block 422 of FIG. 4, the first node 10 (or, more specifically, the processing circuitry 12 of the first node 10) may indicate a failure, e.g. by initiating transmission of a message to indicate that the deployment of the at least one FaaS platform is unsuccessful.

On the other hand, at block 412 of FIG. 4, one or more third constraints on function invocation locations may be derived (or constructed). The one or more third constraints may take into account the one or more first constraints provided by the first request 40 and/or the result of the at least one infrastructure component instantiation at block 408 of FIG. 4. At block 414 of FIG. 4, the first node 10 (or, more specifically, the processing circuitry 12 of the first node 10) initiates transmission of a third request 60 towards the third node 30. As mentioned earlier, the third node 30 is configured to manage the at least one FaaS platform and the third request 60 is a request to configure the at least one FaaS platform to run the software. In this way, the first node 10 (or, more specifically, the processing circuitry 12 of the first node 10) can configure the at least one FaaS platform. The at least one FaaS platform can be configured according to the one or more third constraints. An example of the derivation of the one or more third constraints will be described later with reference to FIG. 6.

In some embodiments, the at least one infrastructure component and the at least one FaaS platform may be configured (e.g. programmed) synchronously, i.e. in sync. For example, at block 414 of FIG. 4, there may be two steps implemented in this respect. Firstly, the first node 10 (or, more specifically, the processing circuitry 12 of the first node 10) may pass the one or more third constraints to the third node 30 via a management application programming interface (API). In embodiments involving affinity groups of components, the one or more third constraints may express a mapping of the affinity groups to the at least one FaaS platform. Secondly, the first node 10 (or, more specifically, the processing circuitry 12 of the first node 10) may update one or more client libraries of the at least one FaaS platform linked to the at least one infrastructure component to use a location group identifier as an affinity group annotation when a function intended to be in the affinity group is invoked.

Returning back to FIG. 4, after configuring the FaaS platform, the first node 10 (or, more specifically, the processing circuitry 12 of the first node 10) may check if the configuration of the FaaS platform is successful at block 416 of FIG. 4. If the configuration of the FaaS platform is successful, the method may proceed to block 418 of FIG. 4. At block 418 of FIG. 4, the first node 10 (or, more specifically, the processing circuitry 12 of the first node 10) may indicate success, e.g. by initiating transmission of a message to indicate that the deployment of the at least one FaaS platform is successful.

On the other hand, if the configuration of the FaaS platform is unsuccessful, the method may proceed to block 420 of FIG. 4. At block 420 of FIG. 4, the first node 10 (or, more specifically, the processing circuitry 12 of the first node 10) may roll back or reverse any change conducted during the procedure. At block 422 of FIG. 4, the first node 10 (or, more specifically, the processing circuitry 12 of the first node 10) may indicate a failure, e.g. by initiating transmission of a message to indicate that the deployment of the at least one FaaS platform is unsuccessful.

As described earlier, in some embodiments, the first request 40 can comprise one or more first constraints placed on the at least one infrastructure component and/or the at least one function component. The one or more first constraints can be between the software forming components in the form of affinity groups, regardless of whether those components are function components or infrastructure components. It is thus not possible to derive from the first request 40 any constraints related specifically to the at least one infrastructure component implementing the at least one FaaS platform to be used by the software. Furthermore, the second node 20 is unable to consider the affinity groups as it unaware of the function components implementing the software.

Figure 5:
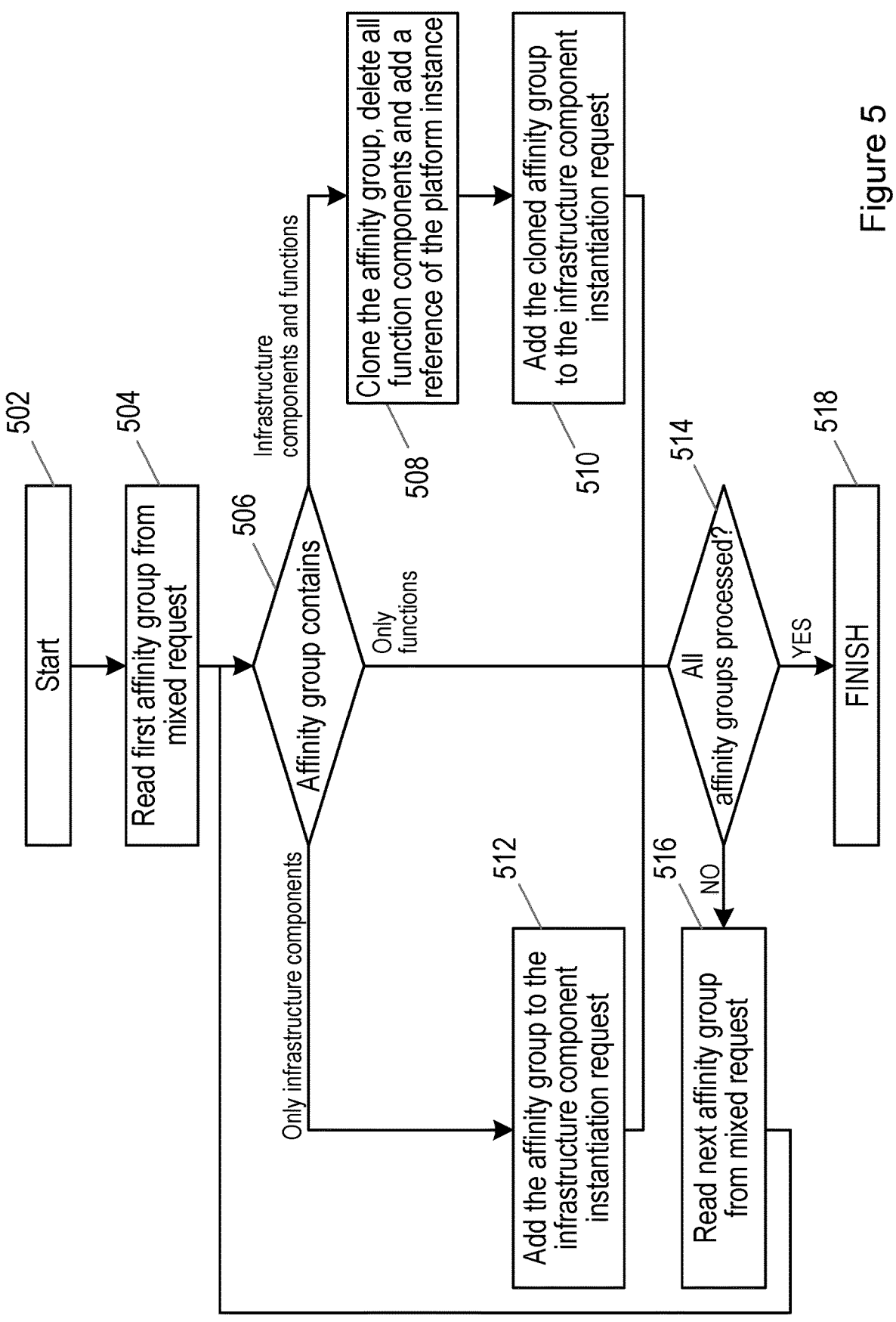
FIG. 5 is a flowchart illustrating a method performed by a first node according to an embodiment.
Figure 6:
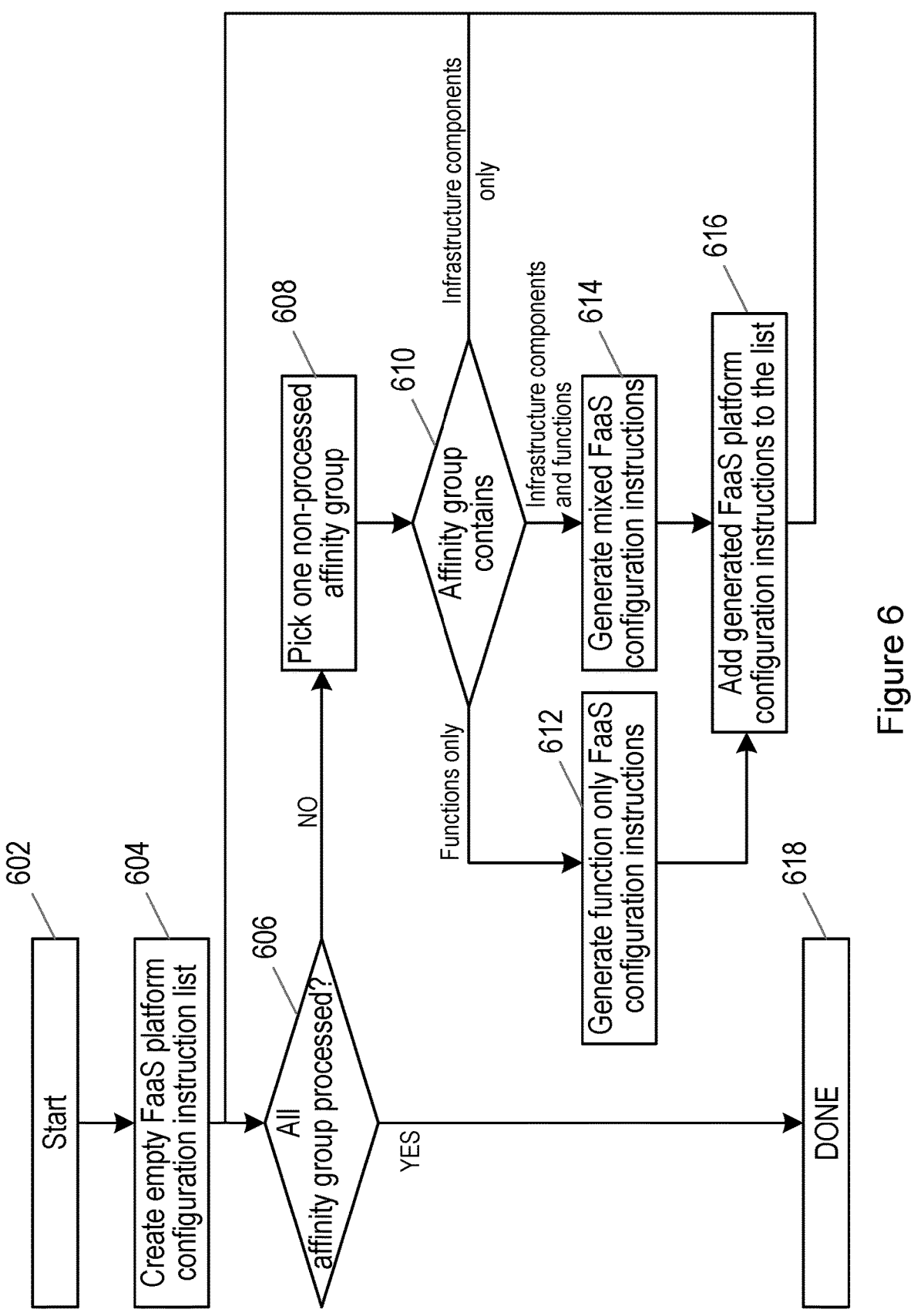
FIG. 6 is a flowchart illustrating a method performed by a first node according to an embodiment.

As such, in some embodiments, mixed affinity groups can be translated into ones specifying one or more second constraints on the at least one infrastructure component and/or one or more third constraints on the at least one FaaS platform individually. An example of a method for deriving one or more second constraints on the at least one infrastructure component is illustrated in FIG. 5 and an example of a method for deriving one or more third constraints on the at least one FaaS platform is illustrated in FIG. 6. The methods assume that the first request 40 is already created and extended with an indication of at least one function component. The method illustrated in FIGS. 5 and 6 are applicable regardless of whether the at least one function component is sharable between software (e.g. between multiple applications or services) or not.

FIG. 5 is a flowchart illustrating a method performed by a first node 10 in accordance with an embodiment. The method is for handling the running of software in a network. More specifically, the method illustrates a manner in which one or more second constraints placed on the at least one infrastructure component may be derived. A constraint may also be referred to as an affinity rule. In effect, as will be described with reference to FIG. 5, infrastructure affinity rule(s) can be generated from mixed function-infrastructure affinity rule(s). The first node 10 described earlier with reference to FIG. 1 is configured to operate in accordance with the method of FIG. 5. The method can be performed by or under the control of the processing circuitry 12 of the first node 10. The method will be described with reference to FIGS. 2 and 5.

The method is started at block 502 of FIG. 5. As mentioned earlier, in some embodiments, the first request 40 is for running the software using a plurality of groups of components, where each group of the plurality of groups of components comprises at least one infrastructure component and/or at least one function component. These groups can be referred to as affinity groups. At block 504 of FIG. 5, upon invocation, the first node 10 (or, more specifically, the processing circuitry 12 of the first node 10) may read a first affinity group from the plurality of affinity groups provided in the first request 40. At block 506 of FIG. 5, the first node 10 (or, more specifically, the processing circuitry 12 of the first node 10) may check the components of the affinity group and, depending on the components present, the method proceeds accordingly.

If, at block 506 of FIG. 5, an affinity group is found to contain at least one infrastructure component and at least one function component (i.e. both function and infrastructure components), the method proceeds to block 508 of FIG. 5. At block 508 of FIG. 5, the first node 10 (or, more specifically, the processing circuitry 12 of the first node 10) may copy (or clone) the affinity group and update the copy of the affinity group by substituting all references to a function component with a reference to the at least one FaaS platform. That is, all function components may be deleted and a reference to the at least one FaaS platform may be added instead. It is advantageous to copy the affinity group as this maintains the scope of the group (e.g. node or site affinity).

At block 510 of FIG. 5, the first node 10 (or, more specifically, the processing circuitry 12 of the first node 10) may add the updated copy of the affinity group to the second request 50 for transmission towards a second node 20. As the updated copy of the affinity group only references the at least one FaaS platform, the second request 50 effectively comprises a second constraint that is to locate the at least one infrastructure component at the same location as the at least one FaaS platform. This allows the second node 20 to optimise the placement of the at least one infrastructure component and the at least one FaaS platform together. The method then moves to block 514 of FIG. 5.

If, at block 506 of FIG. 5, an affinity group is found to contain references to at least one infrastructure component only, the method proceeds to block 512 of FIG. 5. At block 512 of FIG. 5, the first node 10 (or, more specifically, the processing circuitry 12 of the first node 10) may add the affinity group to the second request 50 without any update. The method then moves to block 514 of FIG. 5. If, at block 506 of FIG. 5, an affinity group is found to contain at least one function component only, the first node 10 (or, more specifically, the processing circuitry 12 of the first node 10)

does not generate a new affinity group. Instead, the method proceeds straight to block 514 of FIG. 5.

At block 514 of FIG. 5, the first node 10 (or, more specifically, the processing circuitry 12 of the first node 10) may check whether all affinity groups from the plurality of affinity groups provided in the first request 40 have been processed. If, at block 514 of FIG. 5, it is found that there is still at least one unprocessed affinity group, the first node 10 (or, more specifically, the processing circuitry 12 of the first node 10) may read an unprocessed affinity group from the plurality of affinity groups provided in the first request 40 at block 516 of FIG. 5 and then repeat the method from block 506 onwards in respect of this next affinity group. If, at block 514 of FIG. 5, it is found that all affinity groups have been processed, the method ends at block 518 of FIG. 5.

FIG. 6 is a flowchart illustrating a method performed by a first node 10 in accordance with an embodiment. The method is for handling the running of software in a network. More specifically, the method illustrates a manner in which one or more third constraints placed on the at least one FaaS platform may be derived. As mentioned earlier, a constraint may also be referred to as an affinity rule. In effect, as will be described with reference to FIG. 6, FaaS platform affinity rule(s) can be generated from mixed function-infrastructure affinity rule(s). The first node 10 described earlier with reference to FIG. 1 is configured to operate in accordance with the method of FIG. 6. The method can be performed by or under the control of the processing circuitry 12 of the first node 10. The method will now be described with reference to FIGS. 2 and 6.

The method is started at block 602 of FIG. 6. At block 604, the first node 10 (or, more specifically, the processing circuitry 12 of the first node 10) can initialise itself by creating a list for collecting constraints (or instructions) for the configuration of the at least one FaaS platform. As mentioned earlier, in some embodiments, the first request 40 is for running the software using a plurality of groups of components, where each group of the plurality of groups of components comprises at least one infrastructure component and/or at least one function component. These groups can be referred to as affinity groups. At block 606 of FIG. 6, the first node 10 (or, more specifically, the processing circuitry 12 of the first node 10) may check whether all affinity groups from the plurality of affinity groups provided in the first request 40 have been processed. If, at block 606 of FIG. 6, it is found that all affinity groups from the plurality of affinity groups provided in the first request 40 have been processed, the method ends at block 618 of FIG. 6. The method thus iterates over the affinity groups provided in the first request 40.

If, at block 606 of FIG. 6, it is found that at least one affinity group from the plurality of affinity groups provided in the first request 40 is unprocessed, the method moves to block 608 of FIG. 6. At block 608 of FIG. 6, the first node 10 (or, more specifically, the processing circuitry 12 of the first node 10) may select an unprocessed affinity group from the plurality of affinity groups provided in the first request 40. At block 610 of FIG. 6, the first node 10 (or, more specifically, the processing circuitry 12 of the first node 10) may check the components of the affinity group and, depending on the components present, the method proceeds accordingly.

If, at block 610 of FIG. 6, an affinity group is found to contain references to at least one infrastructure component only, the method proceeds back to block 606 of FIG. 6 as there is no action to take in respect of that affinity group. If, at block 610 of FIG. 6, an affinity group is found to contain at least one function component only, the method proceeds to block 612 of FIG. 6. At block 612 of FIG. 6, the first node 10 (or, more specifically, the processing circuitry 12 of the first node 10) may generate the one or more third constraints to be placed on the at least one FaaS platform. Thus, one or more configuration instructions are generated for the at least one FaaS platform. More specifically, one or more "function only" FaaS configuration instructions are generated.

The one or more third constraints generated at block 612 of FIG. 6 may depend on the type of affinity group. For example, in the case of a node affinity group, the one or more third constraints generated at block 612 of FIG. 6 may comprise a constraint to limit execution of all function components in the affinity group to a single one of the (i.e. the same) at least one FaaS platform, e.g. when called from any of the members of the affinity group. In the case of a site affinity group, the one or more third constraints generated at block 612 of FIG. 6 may comprise a constraint to limit execution of the all function components in the affinity group to a plurality (or any) of the at least one FaaS platform located at a same location (i.e. at the same site), e.g. when called from any of the members of the affinity group. The encoding of the one or more third constraints may depend on the at least one FaaS platform to be configured.

If, at block 610 of FIG. 6, the affinity group is found to contain at least one infrastructure component and at least one function component (i.e. both function and infrastructure components), the method proceeds to block 614 of FIG. 6. At block 614 of FIG. 6, the first node 10 (or, more specifically, the processing circuitry 12 of the first node 10) may generate the one or more third constraints to be placed on the at least one FaaS platform. Thus, one or more configuration instructions are generated for the at least one FaaS platform. More specifically, one or more "mixed" FaaS configuration instructions are generated.

At block 614 of FIG. 6, it may be assumed that a client library of the at least one FaaS platform linked to the at least one infrastructure component is able to pass affinity group encoding metadata together with the at least one function component and that the at least one FaaS platform is able to derive function invocation constraints for that affinity group. In this respect, in some embodiments the first node 10 (or, more specifically, the processing circuitry 12 of the first node 10) may ascertain the number of infrastructure components that are in the affinity group. In some embodiments, the first node 10 (or, more specifically, the processing circuitry 12 of the first node 10) may form location groups of infrastructure components by grouping them based on a server that is hosting them. In some of these embodiments, the first node 10 (or, more specifically, the processing circuitry 12 of the first node 10) may also generate a location group identifier (ID) for each group.

In some embodiments, for each location group, the first node 10 (or, more specifically, the processing circuitry 12 of the first node 10) may ascertain the number of the FaaS platform components that are in a proper affinity with the infrastructure components of the location group. In the case of node affinity, this step can consider one or more FaaS platforms running on the given hosting server. In the case of site affinity, this step can consider one or more FaaS platform components running on any servers deployed to the same site as the given hosting server. In embodiments where the location groups are comprised of one infrastructure component, the first node 10 (or, more specifically, the processing circuitry 12 of the first node 10) may use a combination of an affinity group identifier ID and an infrastructure component name as a group ID. In such a case, the infrastructure component does not need to be configured as it is able to determine the location group name in advance.

At block 616 of FIG. 6, the first node 10 (or, more specifically, the processing circuitry 12 of the first node 10) may add the one or more generated third constraints to the list of constraints (or instructions) for the configuration of the at least one FaaS platform and the method moves back to block 606 of FIG. 6.

Figure 7:
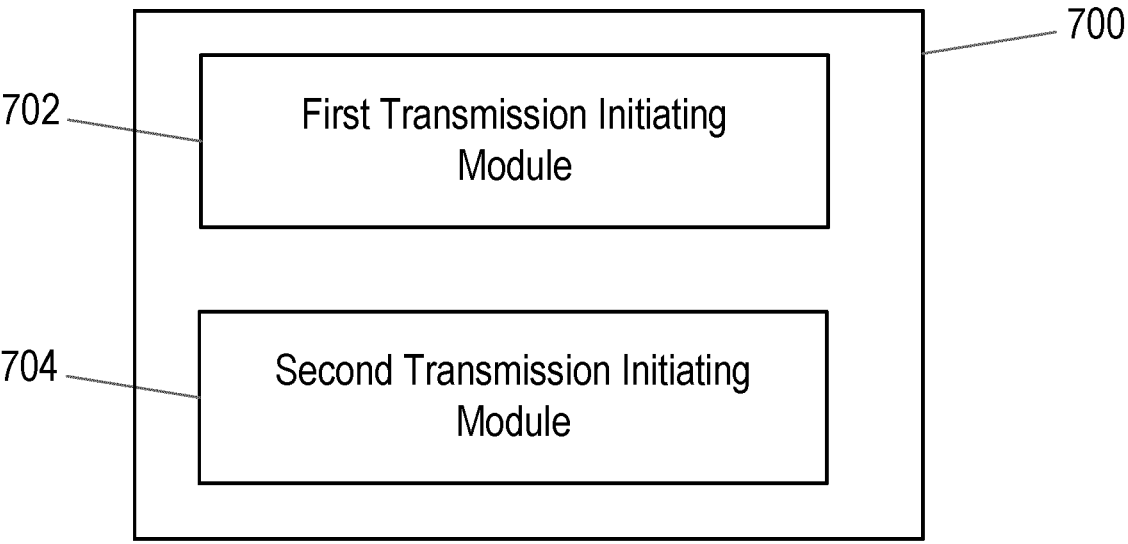
FIG. 7 is a block diagram illustrating a first node according to an embodiment.

FIG. 7 is a block diagram illustrating a first node 700 in accordance with an embodiment. The first node 700 comprises a first transmission initiating module 702 configured to, in response to a first request to run software using at least one infrastructure component and at least one function component, initiate transmission of a second request towards a second node. The second node is configured to manage the at least one infrastructure component. The second request is a request to deploy the at least one infrastructure component and comprises information indicative of at least one FaaS platform implemented by the at least one infrastructure component to be used to run the software. The first node 700 also comprises a second transmission initiating module 704 configured to, in response to the first request to run software using at least one infrastructure component and at least one function component, initiate transmission of a third request towards a third node. The third node is configured to manage the at least one FaaS platform. The third request is a request to configure the at least one FaaS platform to run the software. The first node 700 may operate in the manner described herein in respect of the first node.

There is also provided a computer program comprising instructions which, when executed by processing circuitry (such as the processing circuitry 12 of the first node 10 described earlier), cause the processing circuitry to perform at least part of the method described herein. There is provided a computer program product, embodied on a non-transitory machine-readable medium, comprising instructions which are executable by processing circuitry (such as the processing circuitry 12 of the first node 10 described earlier) to cause the processing circuitry to perform at least part of the method described herein. There is provided a computer program product comprising a carrier containing instructions for causing processing circuitry (such as the processing circuitry 12 of the first node 10 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the first node functionality and/or any other node functionality described herein can be performed by hardware. Thus, in some embodiments, the first node 10 and/or any other node described herein can be a hardware node. However, it will also be understood that optionally at least part or all of the first node functionality and/or any other node functionality described herein can be virtualized. For example, the functions performed by any the first node 10 and/or any other node described herein can be implemented in software running on generic hardware that is configured to orchestrate the node functionality. Thus, in some embodiments, the first node 10 and/or any other node described herein can be a virtual node. In some embodiments, at least part or all of the first node functionality and/or any other node functionality described herein may be performed in a network enabled cloud. The first node functionality and/or any other node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically.

Thus, in the manner described herein, there is advantageously provided a technique for handling the running of software in a network.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method performed by a first node for handling the running of software in a network, the method comprising:
in response to a first request to run software using at least one infrastructure component and at least one function component:
initiating transmission of a second request towards a second node, wherein the second node is configured to manage the at least one infrastructure component and wherein the second request is a request to deploy the at least one infrastructure component and comprises information indicative of at least one function-as-a-service (FaaS) platform implemented by the at least one infrastructure component to be used to run the software;
initiating transmission of a third request towards a third node, wherein the third node is configured to manage the at least one FaaS platform and wherein the third request is a request to configure the at least one FaaS platform to run the software; and
in response to the infrastructure component failing to deploy, repeating initiation of the transmission of the second request towards the second node until the at least one infrastructure component is deployed.

2. The method as claimed in claim 1, wherein:
the second request comprises one or more second constraints placed on the at least one infrastructure component; and/or
the third request is a request to configure the at least one FaaS platform to run the software according to one or more third constraints placed on the at least one FaaS platform.

3. The method as claimed in claim 2, wherein:
the one or more second constraints comprise a constraint to locate the at least one infrastructure component at the same location as the at least one FaaS platform and/or a constraint to limit execution of the at least one function component to at least one infrastructure component that is running the at least one FaaS platform; and/or
the one or more third constraints comprise a constraint to limit execution of the at least one function component to a single one of the at least one FaaS platform or a constraint to limit execution of the at least one function component to a plurality of the at least one FaaS platform located at a same location.

4. The method as claimed in claim 2, wherein:

the first request comprises one or more first constraints placed on the at least one infrastructure component and/or the at least one function component.

5. The method as claimed in claim 4, wherein:

the one or more second constraints and/or the one or more third constraints are based on the one or more first constraints.

6. The method as claimed in claim 4, wherein:

the one or more second constraints are the same as the one or more first constraints except that the one or more second constraints are placed on the at least one infrastructure component, whereas the one or more first constraints are placed on the at least one infrastructure component and/or the at least one function component; and/or the one or more third constraints are the same as the one or more first constraints except that the one or more third constraints are placed on the at least one FaaS platform, whereas the one or more first constraints are placed on the at least one infrastructure component and/or the at least one function component.

7. The method as claimed in claim 1, wherein:

if the at least one FaaS platform is already deployed:

the information indicative of the at least one FaaS platform is information indicative of the already deployed at least one FaaS platform.

8. The method as claimed in claim 7, wherein:

if the already deployed at least one FaaS platform fails to meet one or more requirements of the software:

the second request further comprises information indicative of one or more changes to be made to the already deployed at least one FaaS platform for the already deployed at least one FaaS platform to meet the one or more requirements of the software.

9. The method as claimed in claim 1, wherein:

if the at least one FaaS platform is not already deployed:

the second request is a request to deploy the at least one infrastructure component and the at least one FaaS platform.

10. The method as claimed in claim 9, wherein:

initiating the transmission of the third request towards the third node is in response to successful deployment of the at least one FaaS platform.

11. The method as claimed in claim 9, the method comprising:

in response to unsuccessful deployment of the at least one FaaS platform:

initiating transmission of a message to indicate that the deployment of the at least one FaaS platform is unsuccessful; or in response to successful deployment of the at least one FaaS platform:

initiating transmission of a message to indicate that the deployment of the at least one FaaS platform is successful.

12. The method as claimed in claim 1, the method comprising:

in response to unsuccessful configuration of the at least one FaaS platform to run the software:

initiating transmission of a message to indicate that configuration of the at least one FaaS platform to run the software is unsuccessful; or in response to successful configuration of the at least one FaaS platform to run the software:

initiating transmission of a message to indicate that the configuration of the at least one FaaS platform to run the software is successful.

13. The method as claimed in claim 1, wherein:

the first request is for running the software using a plurality of groups of components, wherein each group of the plurality of groups of components comprises at least one infrastructure component and/or at least one function component; and the method is performed for each group of the plurality of groups of components.

14. The method as claimed in claim 1, wherein: the software is a service or an application.

15. The method as claimed in claim 1, wherein:

the at least one function component comprises at least one function; and/or the at least one infrastructure component comprises at least one container and/or at least one virtual machine.

16. The first node comprising: processing circuitry configured to operate in accordance with claim 1.

17. The first node as claimed in claim 16, wherein: the first node comprises:

at least one memory for storing instructions which, when executed by the processing circuitry, cause the first node to operate in accordance with the method performed by a first node for handling the running of software in a network, the method comprising:

in response to a first request to run software using at least one infrastructure component and at least one function component:

initiating transmission of a second request towards a second node, wherein the second node is configured to manage the at least one infrastructure component and wherein the second request is a request to deploy the at least one infrastructure component and comprises information indicative of at least one function-as-a-service (FaaS) platform implemented by the at least one infrastructure component to be used to run the software; and initiating transmission of a third request towards a third node, wherein the third node is configured to manage the at least one FaaS platform and wherein the third request is a request to configure the at least one FaaS platform to run the software.

18. A computer program product, embodied on a non-transitory machine-readable medium, comprising instructions which are executable by processing circuitry to cause the processing circuitry to perform the method according to claim 1.

*   *   *   *   *